United States Patent [19]
Sako et al.

[11] Patent Number: 5,799,809
[45] Date of Patent: Sep. 1, 1998

[54] BLOW MOLDED CONTAINER AND BLOW MOLD THEREOF

[75] Inventors: Isamu Sako; Masato Honda; Jyoji Sato; Masato Seguchi; Hiroyuki Hisama, all of Buzen, Japan

[73] Assignee: Yoshino Kogyosho Co., Ltd., Tokyo, Japan

[21] Appl. No.: 718,521

[22] PCT Filed: Feb. 2, 1996

[86] PCT No.: PCT/JP96/00224

§ 371 Date: Oct. 8, 1996

§ 102(e) Date: Oct. 8, 1996

[87] PCT Pub. No.: WO96/25284

PCT Pub. Date: Aug. 22, 1996

[30] Foreign Application Priority Data

Feb. 16, 1995 [JP] Japan .................. 7-065313

[51] Int. Cl.⁶ .................. B65D 1/02; B65D 23/02; B29C 49/48; B29C 49/50
[52] U.S. Cl. .................. 215/12.1; 215/12.2; 215/370; 220/453; 425/531
[58] Field of Search .................. 215/12.1, 12.2, 215/370, 375; 425/531; 264/515; 220/453

[56] References Cited

U.S. PATENT DOCUMENTS

| | | | |
|---|---|---|---|
| 3,561,629 | 2/1971 | Turner | 215/12.2 |
| 3,592,885 | 7/1971 | Goins et al. | 215/370 X |
| 3,687,593 | 8/1972 | Gilbert | 425/531 |
| 3,692,453 | 9/1972 | Quigg | 425/531 |
| 3,758,654 | 9/1973 | Martino | 425/531 |
| 5,316,135 | 5/1994 | Kneer et al. | 215/12.1 X |

FOREIGN PATENT DOCUMENTS

| | | | |
|---|---|---|---|
| 182094 | 5/1986 | European Pat. Off. | 264/515 |
| 550772 | 7/1993 | European Pat. Off. | 215/12.1 |
| 52-30869 | 3/1977 | Japan . | |
| U-3-3460 | 1/1991 | Japan . | |
| A-5-310265 | 11/1993 | Japan . | |
| U-6-11164 | 2/1994 | Japan . | |

*Primary Examiner*—Sue A. Weaver
*Attorney, Agent, or Firm*—Oliff & Berridge, PLC

[57] ABSTRACT

A blow molded container of the present invention is a container formed by blow molding in which a single-layer or multi-layer parison comprising a cylindrical resin material is heated and inflated by air in a mold, wherein a bottom sealing portion formed by pinch offs of the mold has a projection projecting outwardly from the container and sunk portions formed in one of the resin layers constituting the projection such a manner as to be buried in the other resin layer. Therefore, the bonded area between the resin layers is widened, thereby having higher bond strength and higher strength against the shearing force along the fusion bonded area

13 Claims, 5 Drawing Sheets

FIG. 1
FIG. 2
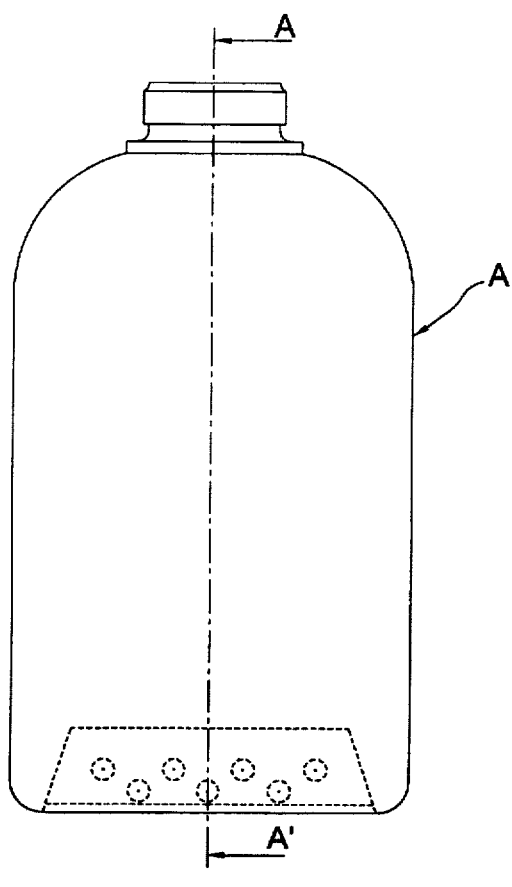
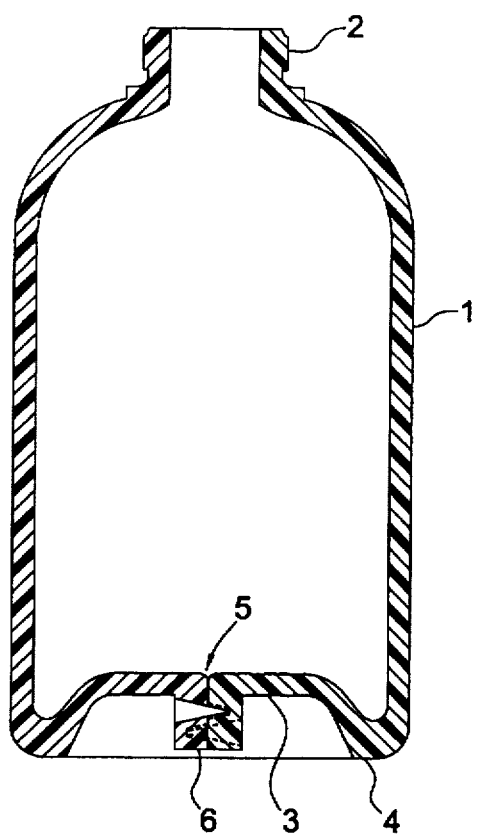
FIG. 3
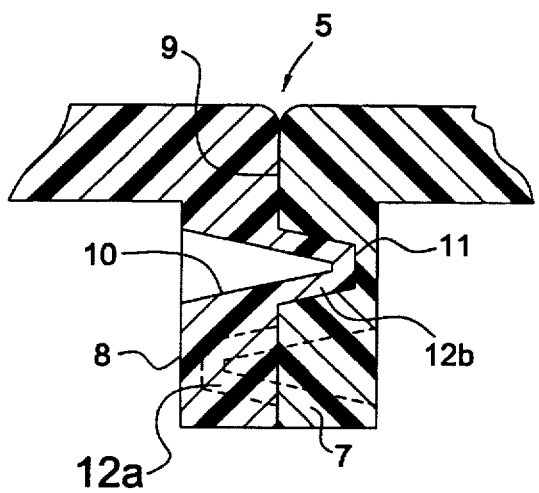

1

BLOW MOLDED CONTAINER AND BLOW MOLD THEREOF

TECHNICAL FIELD

The present invention relates to a blow molded container with a featured bottom sealing portion and a blow mold used for the blow molding.

BACKGROUND ART

It is known that a bottom sealing portion formed by pinch-offs of the mold is projected to strengthen the bottom sealing portion of a single-layer or multi-layer blow molded container (for example, Japanese Published Unexamined Utility Model Application No. H03-3460, Japanese Utility Model Publication No. H06-11164).

Such a container with a projected bottom sealing portion has higher bond strength than a normal type. However, when the container is a plastic container made of material providing weak pinch-off portions against drop impact such as polyethylene terephthalate or polypropylene or when the container is a large-volume plastic container, there is a problem of cracking in the bottom sealing portion when the container drops down with the content therein.

A multi-layer blow molded container, of which an inner layer and an outer layer can be freely separated from each other to completely pour out the content, is well known (see, for example, Japanese Published Unexamined Patent Application No. H05-310265).

In the conventional container, when pouring out the content, the outer layer is maintained in the container's profile while the inner layer is deformed due to the depressurization. Therefore, air is entrapped into the separated part between the outer layer and the inner layer.

However, since air is entrapped from a slit formed between the edges of the outer layer at the bottom pinch-off portion, the container also entraps moisture when the container is used in a damp area such as a bathroom. In addition, there is a problem that the decrease in the content can not be viewed.

Then, a container with a slit formed in the outer layer at the upper side and of which the inner layer and the outer layer are bonded at the bottom pinch-off portion has been proposed. However, since the container must be made of resin with low bond strength in order to separate the outer layer and the inner layer from each other, the cracking of the bottom sealing joint and the occurrence of slit due to the separation between layers cannot be prevented with the conventional configuration of the bottom pinch-off portion.

To overcome the aforementioned problems, it is a first object of this invention to provide a blow molded container with strengthened bottom sealing portion and a blow mold used for the blow molding and it is a second object of this invention to provide a separable multi-layer plastic container in which the bottom sealing portion is improved not to entrap moisture from the bottom by the above technique and the inner layer can be smoothly separated to completely consume the contents.

DISCLOSURE OF INVENTION

The present invention comprises as follows to achieve the aforementioned objects.

The container of the present invention is formed by blow molding in which a parison comprising a cylindrical resin material is heated and inflated by fluid.

2

The mold has pinch-offs for holding the parison and fusion-bonding one of resin layers to the other one so as to form a bottom sealing portion of the container and for pinching off the residual resin.

The bottom sealing portion formed by the pinch-offs has a projection projecting outwardly and downwardly from the container and sunk portions formed in one of the resin layers constituting said projection such a manner as to be buried in the other resin layer.

Since the mold pinches the cylindrical parison, the bottom sealing portion is formed as a strip-like projection projecting outwardly and downwardly from the bottom of the container and extending along a parting line of the mold.

Since the bottom sealing portion is provided with the sunk portions, the resin layers constituting the bottom sealing portion which are bonded together are engaged with each other.

Since the resin layers are bonded in the engaged state with the sunk portions formed in the respective resin layers, the bonded area between the resin layers is widened so that the bond strength of the bottom sealing portion is improved and the container has higher strength against the shearing force along the fusion bonded area.

The container of the present invention may have a laminated (multi-layer) structure formed by a plurality of resin layers. The container may be characterized in that the resin layers are of different types from each other and the inner resin layer is separable from the outer resin layer. The container provides useful advantages in case of having a fluid pumping device at the neck thereof. That is, as the fluid in the container is pumped out by the fluid pumping device, negative pressure is developed in the container according to the decrease of the fluid. The negative pressure separates the inner layer from the outer layer of the laminated container so that the inner layer shrinks without change in the configuration of the container.

In such a separable multi-layer plastic container, the aforementioned structure of the bottom sealing portion is employed for the bottom of the container and the container is provided with a path for communicating with the atmosphere at an upper portion thereof so that the atmospheric air is introduced between the inner layer, thereby facilitating the separation of the inner layer and the shrinkage of the separated inner layer.

Since the path is formed in the upper portion of the container, the container is prevented from entrapping moisture so that the inner bag can be smoothly separated to completely pour out the content. This is an advantage for a container used in a damp area such as a shampoo container. The path as mentioned above may be a slit, an opened hole, or the like.

Particularly for such a separable multi-layer plastic container, providing the sunk portions effectively improves the strength of the bottom sealing portion. That is, by improving the bottom sealing portion in the separable multi-layer plastic container, the bottom sealing portion can be strongly bonded even when the inner bag is made of resin such as nylon providing weak bond strength, thereby preventing the occurrence of slit due to the separation between the layers.

The blow mold for molding the container as mentioned above is a blow mold in which a parison comprising a cylindrical resin material is heated and inflated by fluid.

The mold comprises splits facing each other to form a cavity for molding a container inside thereof The splits each have a pinch-off at a position corresponding to the bottom of the container for holding the parison and fusion-bonding one of resin layers to the other one so as to form a bottom sealing portion of the container and for pinching off the residual resin.

The pinch-offs each have stepped portions to form a concavity for molding the bottom sealing portion when superposing on each other.

At least one split has protrusions, which is pushed to partially enter into the resin layer of said concavity, at the stepped portion of the pinch-off thereof.

The protrusions may be pins for pushing the resin layer of the parison.

In the blow mold, since the splits have stepped portions disposed at the pinch-offs and protrusions disposed at the stepped portions so as to make sunk portions in the resin layers, thereby facilitating the fusion bond between the resin layers in the engaged state.

BRIEF DESCRIPTION OF DRAWINGS

FIG. 1 is a front view showing a single-layer blow molded container according to the present invention;

FIG. 2 is a sectional view taken along the line A-A' of FIG. 1;

FIG. 3 is an enlarged sectional view of a bottom sealing portion of the single-layer blow molded container according to the present invention;

BEST MODE FOR CARRYING OUT THE INVENTION

Figure 4:
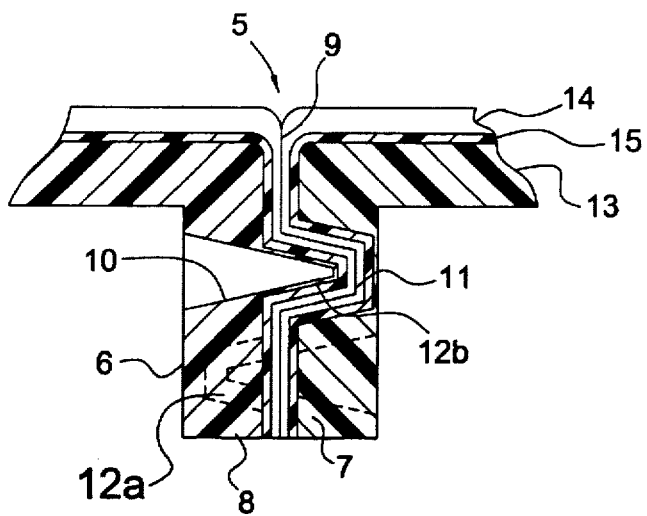
FIG. 4 is an enlarged sectional view of a bottom sealing portion of a multi-layer blow molded container according to the present invention.

Hereinafter, embodiments of the present invention will be described with reference to attached drawings.

FIG. 1 and FIG. 2 show a single-layer blow molded container according to the present invention.

In those figures, the mark A designates a single-layer plastic container made by blow molding from single-layer parison made of resin such as polyethylene terephthalate or polypropylene. A container made of such resin generally has weak pinch-off portions against drop impact The container comprises a body 1, a neck 2, a bottom face 3, and a bottom end 4 for standing the container.

The bottom face 3 is provided with a bottom sealing portion 5 formed by pinch-offs of the mold. The bottom sealing portion 5 is formed as a strip-like projection 6 projecting outwardly and downwardly from the bottom of the container and extending along a parting line of the mold.

The section of the bottom sealing portion 5 is shown in FIG. 3. Before the detail description of the structure of the bottom sealing portion 5, the blow mold of the present invention and the operation thereof will now be described with reference to FIGS. 5 through 7.

The blow mold 20 comprises two splits 20a, 20b facing each other, which have cavities 21a, 21b formed in the same configuration of the container and pinch-offs 22a, 22b for pinching off the parison P as a molding material, respectively.

The pinch-offs 22a, 22b comprise pinch-off blades 23a, 23b each provided with relief 24a, 24b formed at the lower portion thereof, stepped portions 25a, 25b each formed behind the tip of the pinch-off blade, and pins 26a, 26b projecting from the stepped portions 25a, 25b respectively.

Each pinch-off blade 23a, 23b and each stepped portion 25a constitute together a concavity for receiving resin layers 7, 8 of the parison P and forming a protrusion 6 as one of projections of the bottom sealing portion.

The pins 26a disposed on the stepped portion 25a and the pins 26b disposed on the stepped portion 25b which face each other are not at the same level to be uniformly spaced each other in the closed state.

The pins 26a, 26b are each formed in truncated cone such that the ends of the pins 26 press the resin layers 7, 8 to form the projections and sink the projections into the opposite resin layers. The height H of each pin 26a, 26b may be set in such a manner that the projections of the resin layers The pins may be considered projections of the blow mold or equivalents thereof. 7, 8 are sunk in the opposite resin layers at least half in the thick direction. Preferably, the height H is 1.3 through 1.5 times of the width W of the pinch-off blades.

Too long distance between pins weakens the bond strength, while too short distance introduces interference at the sunk portion. In view of the foregoing, the distance between the pins is suitably selected for practice. The distance between the pins is preferably selected in such a manner that the distance between the axes of the pins is about 2 through 4 times of the diameter of the base portion of the pin.

Though the pins at the both sides are disposed zigzag in the vertical direction in the above embodiment, the pins may be disposed at the same level in such a manner as to alternate with each other. The pin may be formed in any configuration allowing the formation of a sunk portion by pressing the resin layers.

Hereinafter, the operation of the mold during molding will be described.

Figure 5:
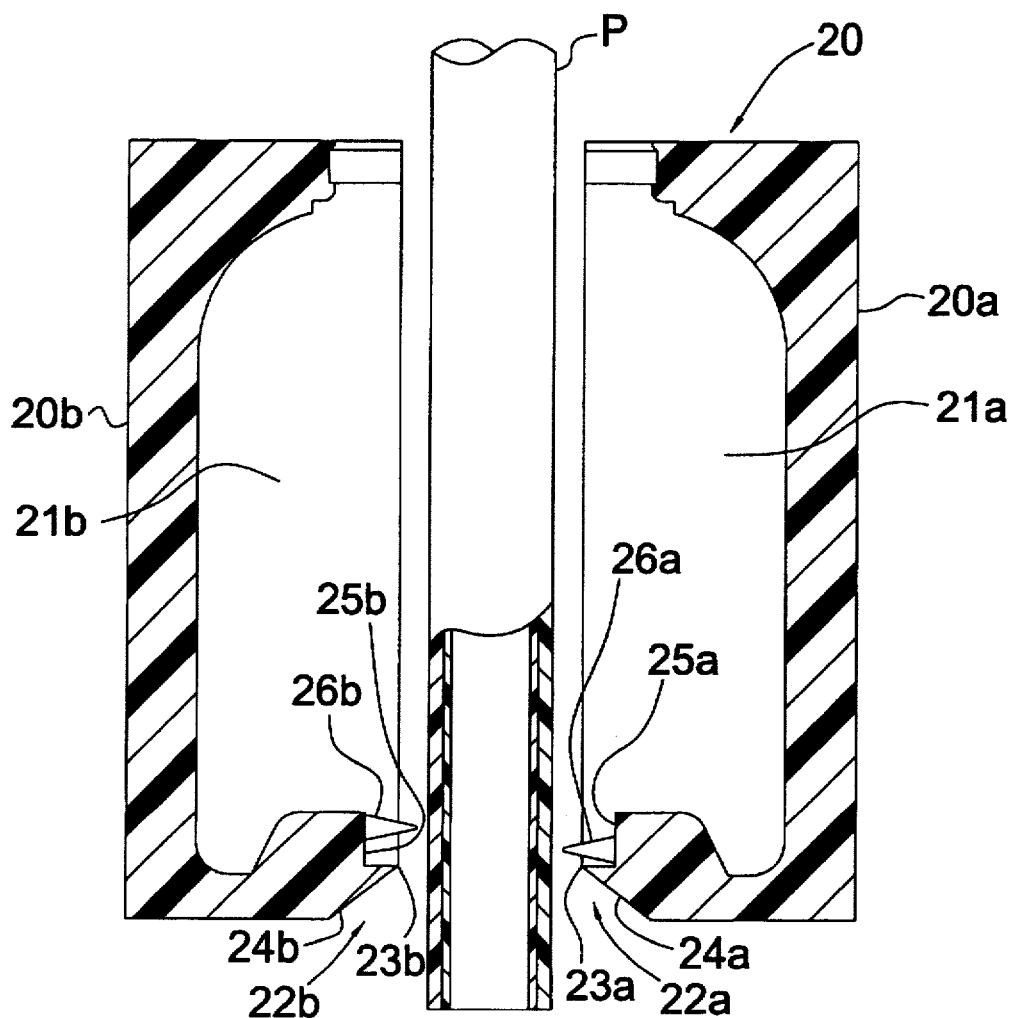
FIG. 5 is a front view showing a blow mold according to the present invention before pinching a parison.

FIG. 5 shows the blow mold 20 at a point when the parison P comprising multi-layer resin is supplied therein. From this state, the splits 20a, 20b come close to each other until reaching a contact position as shown in FIG. 6.

At this point, the parison P is pressed by the pins 26a, 26b and pinched by the pinch-off blades 23a, 23b.

Figure 6:
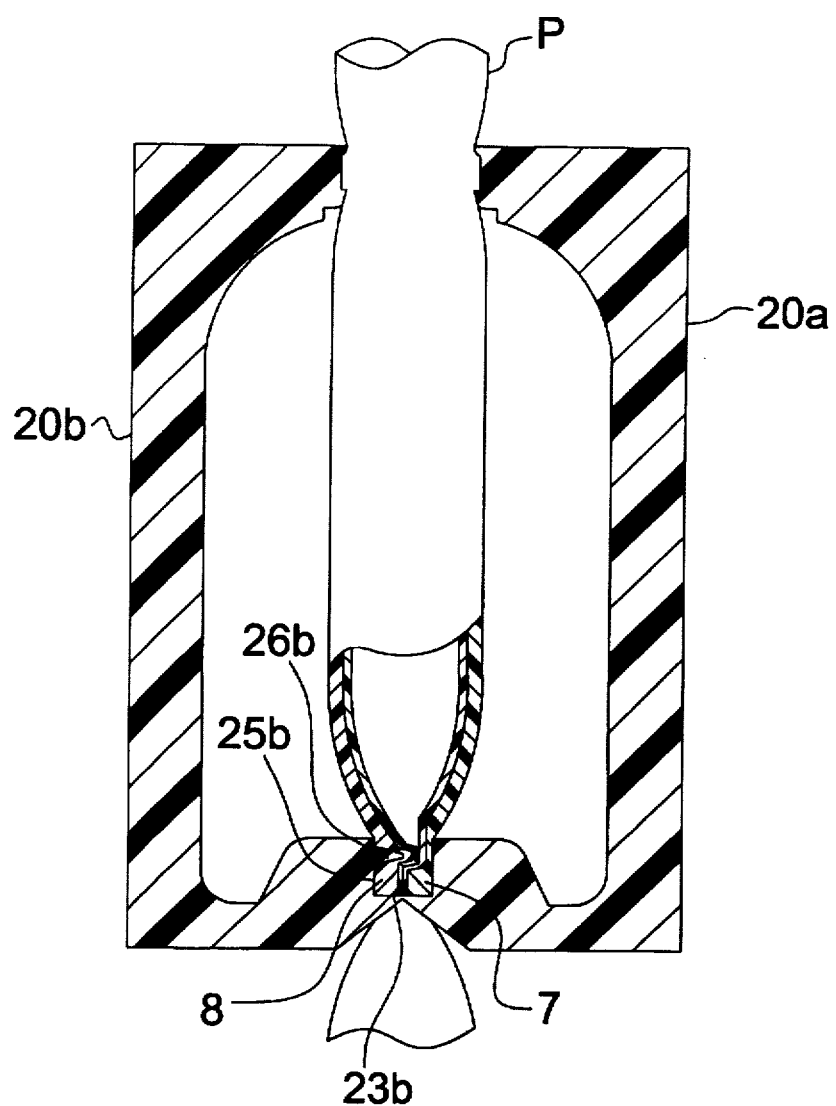
FIG. 6 is a front view showing the blow mold according to the present invention with the parison being compressed and bonded to engage resin layers each other.
Figure 7:
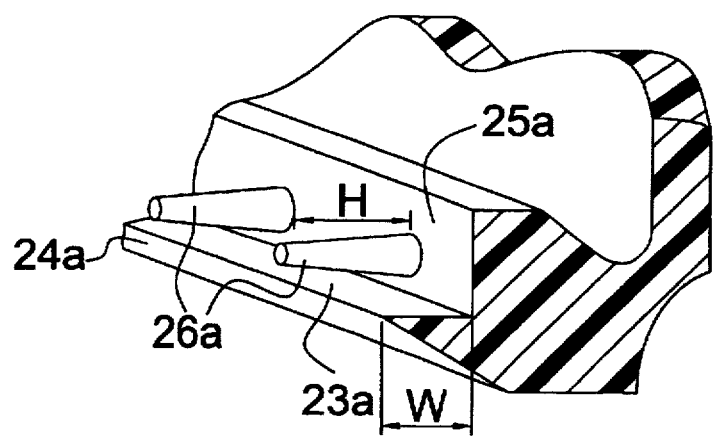
FIG. 7 is a perspective view showing the blow mold according to the present invention with the section being the center of pinch-off.
Figure 8:
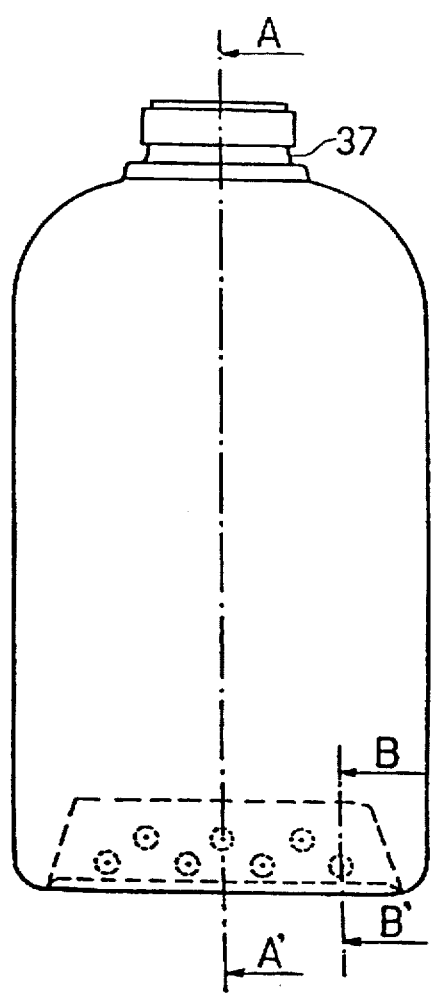
FIG. 8 is a front view of a separable multi-layer plastic container according to the present invention.
Figure 9:
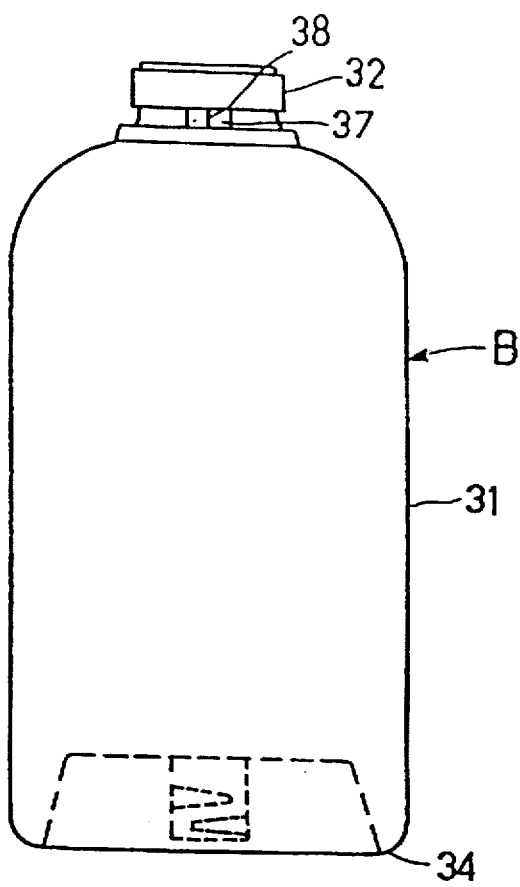
FIG. 9 is a side view of the separable multi-layer plastic container according to the present invention.
Figure 10:
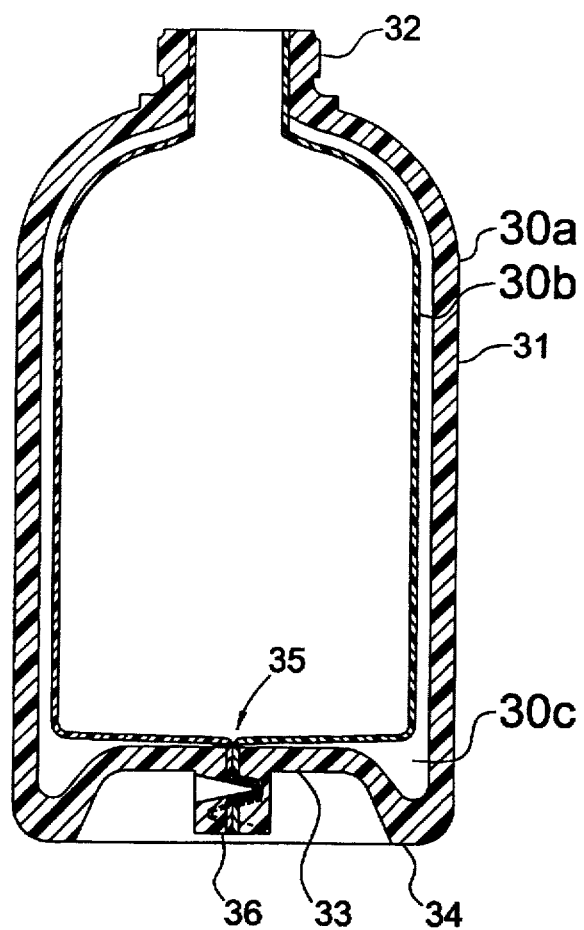
FIG. 10 is a sectional view of the separable multi-layer plastic container taken along the line A-A' of FIG. 8, with the inner bag being separated.

When the pinch-offs 22a, 22b are positioned as shown in FIG. 6, the opposite resin layers 7, 8 are fusion bonded each other, the projection 6 is formed by the concavities of the pinch-offs 22a, 22b, and the sunk portions 12 are formed by the pins 26a, 26b.

At the same time, the lower end of the parison P is cut off by the pinch-off blades 23a, 23b and then compressed fluid is blew in the bonded parison P from a blow inlet so that the parison P is deformed in the configuration formed by the cavities 21a, 21b.

Hereinafter, the structure of the molded bottom sealing portion will be described.

In FIG. 3, the numeral 6 designates projection molded by the pinch-offs, 7, 8 designate the resin layers, and 9 designates a fusion bond area.

The numeral 10 designates a concavity formed in the resin layer 8 by one of the pins 26b projecting from the stepped portion 25b of the mold. The concavity 10 has a top 11 sunk in the opposite resin layer 7 to form a sunk portion 12b. The resin layer 7 is also provided with a sunk portion 12a in the same manner which is sunk in the opposite resin layer 8.

Since the sunk portions are formed and disposed alternatively, the fusion bond area 9 is bonded in the engaged state.

The description will now be made as regard to the effects of the bottom sealing portion. Since the resin layers are bonded in the engaged state, the bonded area between the resin layers is widened, thereby making the bond strength higher.

In addition, the sunk portions are disposed at the right angle against the shear force in the longitudinal direction of the projection and the vertical direction of the container, thereby making the bond strength between the layers higher and the strength of the bottom sealing portion higher too.

Hereinafter, a multi-layer blow molded container according to the present invention will be described.

FIG. 4 shows a bottom sealing portion of the multi-layer blow molded container. The method of molding a bottle may be the same as molding a single-layer bottle with the same blow mold but using a multi-layer parison.

In those figures, the numerals 7, 8 designate resin layers, 9 designates a fusion bond area, 10 designates a concavity, 11 designates a projecting end, and 12a, 12b designates sunk portions.

The resin layers 7, 8 each comprise an outer layer 13, an inner layer 14, and a bonding layer 15. The inner layer 14 is a functional layer made of nylon, EVAL® (ethylene-co-vinyl alcohol), polyethylene terephthalate or the like and the outer layer 13 is a reinforcing layer made of high-density polyethylene, polypropylene or the like.

The sunk portions 12a, 12b are formed by the pins 26a, 26b provided in the pinch-offs in the same manner as the single-layer blow molded container. The fusion bond area 9 is bonded in the engaged state.

The fusion bond area is formed in the engaged state with the sunk portion 12a, 12b so as to strengthen the bottom sealing portion even when it is made of material such as nylon providing weak bond strength at pinch-offs, thereby preventing the cracking of the bottom.

The resin multi-layer may be any one of other than the aforementioned kinds of resins. It should be understood some kinds of resin may be used without requiring the bonding layer.

The description will now be made as regard to a separable multi-layer plastic container according to the present invention with reference to FIGS. 8–12.

In those figures, the mark B designates a separable multi-layer plastic container having an outer layer 30a and an inner layer 30b. The separable multi-layer plastic container B comprises a body 31, a neck 32, a bottom face 33, and a bottom end 34. The neck is provided with a concavity 37 formed by cutting a part of the periphery thereof, and a slit 38 for introducing atmospheric air between the inner layer and the outer layer.

The bottom face 33 is provided with a bottom sealing portion 35 with a projection 36 projecting downwardly and formed by pinch-offs of the mold.

The outer layer 30a is made of high-density polyethylene for maintaining the container's profile, while the inner layer is a inner bag made of resin such as nylon or EVAL which is separable from the outer layer and deformable.

The numeral 30c designates a separating space between the outer layer and the inner layer.

To form the slit 38 and the bottom sealing portion 35, a blow mold employed is provided with upper pinch offs, for fusion-bonding the inner layers and pinching off the outer layers, at portions corresponding to the concavities of the neck of the container and bottom pinch offs each having a stepped portion with the aforementioned pins projecting therefrom at the bottom thereof so that during blow molding, the slit 38 is formed by the upper pinch offs and the bottom sealing portion 35 is formed by the bottom pinch-offs.

In case of the container having a slit at the upper end of the body, the slit can be formed by blow-molding a parison of which diameter is larger than that of the neck of the container by using a blow mold provided with pinch-offs at the bottom and pinch-offs at portions corresponding to the upper end of the container. (Not shown).

The bottom sealing portion 35 of the container is formed by resin layers 39, 40 constituting the outer layer 30a and the inner layer 30b, respectively.

Figure 11:
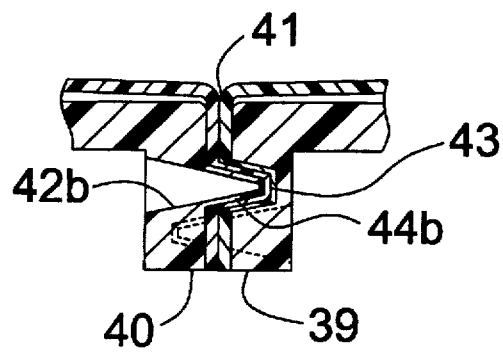
FIG. 11 is an enlarged sectional view of a bottom sealing portion of the separable multi-layer plastic container, taken along the line A-A' of FIG. 8.
Figure 12:
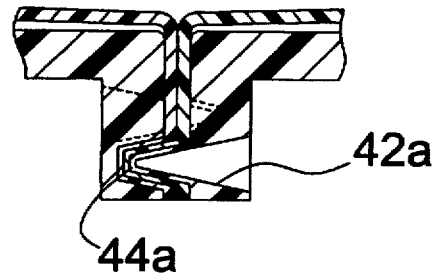
FIG. 12 is a sectional view taken along the line B-B' of FIG. 8.

In FIG. 11 and FIG. 12, the numeral 41 designates a fusion bond area, 42a, 42b designates a concavity formed in the resin layer 40 by one of the pins 26b projecting from the stepped portion 25b of the mold, 43 designates a projection end of each concavity at the inner layer side. The projection ends 43 are pressed into the resin layer 39 to form sunk portions 44b.

The resin layer 39 is also provided with concavities of which projection ends are pressed into the resin layer 40 to form sunk portions 44a.

The aforementioned sunk portions 44a, 44b are alternatively formed and arranged so that the fusion bond area 41 is formed in the engaged state.

The description will now be made as regard to the effects of the separable multi-layer plastic container of the present invention. Since the resin layers are bonded in the engaged state with the sunk portions formed in the respective resin layers, the bond strength of the bottom sealing portion is improved and the container has higher strength against the shearing force along the fusion bonded area so that the bottom sealing portion can be strongly bonded even when the inner bag is made of resin such as nylon providing weak bond strength, thereby preventing the occurrence of slit due to the separation between the layers.

In addition, since the upper portion of the container is provided with the slit for introducing the atmospheric air between the inner layer and the outer layer, the air is introduced as needed without entrapping moisture so that the inner bag can be smoothly separated to completely pour out the content.

Industrial Applicability

As structured above, the present invention have following effects.

Since the bottom sealing portion is protuberant and the sunk portions are formed in the respective resin layers to engage the resin layers with each other, the bond strength of the bottom sealing portion is improved and the container has higher strength against the shearing force along the fusion bonded area.

The bottom sealing portion is improved in the bond strength, thereby preventing the cracking of the bottom even when the container is a plastic container made of material providing weak pinch-off portions against drop impact such as polyethylene terephthalate or polypropylene or when the container is a large-volume plastic container.

In the separable multi-layer plastic container, the bottom sealing portion can be strongly bonded even when the inner bag is made of resin such as nylon providing weak bond strength, thereby preventing the occurrence of slit due to the separation between the layers without entrapping moisture from the bottom of the container.

In addition, since the upper portion of the container is provided with the slit for introducing the atmospheric air between the inner layer and the outer layer, the air is introduced as needed without entrapping moisture from the bottom of the container so that the inner bag can be smoothly separated to completely pour out the content.

Since the container according to the present invention has the effects as mentioned above, the container can be used in various applications. Particularly, when the container is used in a damp area such as a bathroom or a kitchen, the container of the present invention provides extremely useful advantages.

We claim:

1. A blow molded container formed by blow molding a parison comprising a resin material in a blow mold, wherein the blow mold includes splits, each of said splits having pinch-offs and opposing projections facing one another at different heights disposed proximate to the pinch-offs, wherein said blow molded container comprises:

a body formed of resin layers, said pinch offs holding the parison and fusion bonding the resin layers to one another, and pinching off residual resin formed while the resin layers are fusion bonded;

a bottom sealing portion formed by the pinch-offs during the fusion-bonding of the resin layers, the bottom sealing portion having sunk portions formed by the opposing projections in each of the resin layers, the sunk portions in each of the resin layers being at offset heights with respect to the pinch-offs, said offset heights substantially corresponding to the heights of the opposing projections.

2. The blow molded container as claimed in claim 1, wherein the resin layers of the bottom sealing portion include multi-layer plastics and comprise a plurality of resin layers.

3. The blow molded container as claimed in claim 2, wherein an outer layer of the resin layers is provided with a path for communicating with the atmosphere at an upper portion thereof.

4. The blow molded container as claimed in claim 3, wherein the container is provided with a concavity around a periphery of a neck portion and said path is formed in the outer layer of said concavity.

5. A blow molded container formed by blow molding a parison comprising a resin material, the blow molded container having a body, a neck and a bottom formed from resin layers, the blow molded container further comprising:

a bottom sealing portion proximate to the bottom of the container, the bottom sealing portion defined as a projection projecting downward and outward;

a fusion bonding portion that bonds the resin layers proximate to the projection;

sunk portions formed in the resin layers wherein the sunk portion on one resin layer being buried in another resin layer and the one sunk portion being at an offset height from the another sunk portion with respect to the bottom sealing portion; and projecting ends disposed proximate to the sunk portions, respectively, wherein the sunk portions and the projecting ends strengthen the bottom sealing portion.

6. The container as claimed in claim 5, wherein the resin layers comprise an inner layer, an outer layer and a bonding layer disposed between the inner and outer layers.

7. The container as claimed in claim 6, wherein the neck is provided with a concavity and a slot, the slot introducing air between the inner layer and the outer layer. The pins may be considered projections of the blow mold or equivalents thereof.

8. A blow mold in which a parison comprising a resin material is heated and inflated by fluid, said blow mold comprising:

splits facing each other to form a cavity for molding a container inside the splits, each of said splits having a pinch-off positioned at a bottom of the container, each said pinch-off holding the parison and fusion-bonding resin layers to form a bottom sealing portion of the container, each said pinch-off further pinching off residual resin formed while said resin layers are being fusion-bonded;

each said pinch-offs having a stepped portion forming a concavity for molding the bottom sealing portion when superposing on each other; and at least one projection formed on each of said splits a first projection on one of said splits being at a different height than a second projection on another one of said splits, the projection on the one split being pushed to partially enter into the resin layer of said concavity at the stepped portion of the pinch-off and the projection on the other split being pushed to partially enter the other resin layer of said concavity, the first and second projections entering the resin layers at different heights.

9. The blow mold as claimed in claim 8, wherein each said pinch-off has a leading edge having a blade, the blades pinching-off the residual resin.

10. The blow mold as claimed in claim 9, wherein the height of the projections are approximately 1.3 to 1.5 time a width of the pinch-off blades.

11. The blow mold as claimed in claim 8, wherein each of said projections is shaped as truncated cones.

12. The blow mold as claimed in claim 8, wherein a distance between the projections is selected so that a distance between axes of the projections is approximately 2 to 4 times that of a base portion of the projections.

13. The blow mold as claimed in claim 8, further comprising upper pinch-offs for fusion-bonding and pinching off resin layers at the bottom sealing portion of the container.

* * * * *